(12) United States Patent
Debras et al.

(10) Patent No.: US 6,479,589 B2
(45) Date of Patent: Nov. 12, 2002

(54) PRODUCTION OF MULTIMODAL POLYETHYLENE

(75) Inventors: Guy Debras, Frasnes Lez Gosselies (BE); Abbas Razavi, Mons (BE); Jacques Michel, Feluy (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 10/037,504

(22) Filed: Jan. 4, 2002

(65) Prior Publication Data

US 2002/0099140 A1 Jul. 25, 2002

Related U.S. Application Data

(62) Division of application No. 09/405,369, filed on Sep. 24, 1999, now Pat. No. 6,346,575.

(30) Foreign Application Priority Data

Sep. 25, 1998 (EP) .............................................. 98118190
Dec. 15, 1998 (EP) .............................................. 98123826

(51) Int. Cl.[7] .......................... C08L 23/00; C08L 23/04
(52) U.S. Cl. ....................................... 525/191; 525/240
(58) Field of Search .................................. 525/191, 240

(56) References Cited

U.S. PATENT DOCUMENTS 6,063,878 A * 5/2000 Debras et al. ................. 526/64

FOREIGN PATENT DOCUMENTS

| EP | 0571987 | 12/1993 |
|----|---------|---------|
| EP | 0575123 | 12/1993 |
| EP | 0600482 | 6/1994 |
| EP | 0605952 | 7/1994 |
| EP | 0735090 | 10/1996 |
| EP | 0791627 | 8/1997 |
| WO | 9526990 | 10/1995 |

* cited by examiner

Primary Examiner—Nathan M. Nutter
(74) Attorney, Agent, or Firm—Gilbreth & Associates

(57) ABSTRACT

A process for preparing polyethylene, including contacting ethylene monomer and an alpha-olefin comonomer to produce a first polyethylene (HLMI of $\leq 0.5$ g/10 min, density $\leq 0.925$ g/ml). The catalyst system is a bis tetrahydroindenyl formula $(IndH_4)_2R''MQ_2$ wherein each Ind is the same or different and is indenyl or substituted indenyl, R" is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen. The polyethylene resin having multimodal molecular weight distribution is formed by mixing the first polyethylene with a second polyethylene (produced with a different catalyst and with a lower molecular weight and higher density than the first polyethylene).

6 Claims, 2 Drawing Sheets

PRODUCTION OF MULTIMODAL POLYETHYLENE

RELATED APPLICATION DATA

The present invention claims is a Divisional Application of and claims benefit under 35 U.S.C. 120 of U.S. patent application Ser. No. 09/405,369, filed Sep. 24, 1999 U.S. Pat. No. 6,346,575, entitled "Production Of Multimodal Polyethylene."

BACKGROUND TO THE INVENTION

The present invention relates to a process for the preparation of polyethylenes, having a multimodal molecular weight distribution, more particularly a bimodal or trimodal molecular weight distribution and exhibiting outstanding mechanical properties for blow-molding, film and pipe applications.

DESCRIPTION OF THE PRIOR ART

Polyolefins such as polyethylenes which have high molecular weight generally have improved mechanical properties over their lower molecular weight counterparts. However, high molecular weight polyolefins can be difficult to process and can be costly to produce. Polyolefins having a bimodal molecular weight distribution are desirable because they can combine the advantageous mechanical properties of high molecular weight fraction with the improved processing properties of the low molecular weight fraction.

For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processability of the resin decreases. By providing a polymer with a broad or bimodal MWD, the desired properties that are characteristic of high molecular weight resin are retained while processability, particularly extrudibility, is improved.

There are several methods for the production of bimodal or broad molecular weight distribution resins: melt blending, reactor in series configuration, or single reactor with dual site catalysts. Use of a dual site catalyst for the production of a bimodal resin in a single reactor is also known.

Chromium catalysts for use in polyolefin production tend to broaden the molecular weight distribution and can in some cases produce bimodal molecular weight distribution but usually the low molecular part of these resins contains a substantial amount of the comonomer. Whilst a broadened molecular weight distribution provides acceptable processing properties, a bimodal molecular weight distribution can provide excellent properties. In some cases it is even possible to regulate the amount of high and low molecular weight fraction and thereby regulate the mechanical properties.

Ziegler Natta catalysts are known to be capable of producing bimodal polyethylene using two reactors in series. Typically, in a first reactor, a low molecular weight homopolymer is formed by reaction between hydrogen and ethylene in the presence of the Ziegler Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene.

Metallocene catalysts are also known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl) zirconium dichloride and an ethylene bis(indenyl) zirconium dichloride. By using the two different metallocene catalysts in the same reactor, a molecular weight distribution is obtained which is at least bimodal.

Polyethylene resins are known for the production of pipes. Pipe resins require high resistance against slow crack growth as well as resistance to rapid crack propagation yielding impact toughness. There is a need to improve in the performance of currently available pipe resins.

EP-A-0571987 discloses a process for producing an ethylenic polymer composition using multistage polymerisation. The catalyst comprises, as principal components, a transition metal compound, a compound capable of reacting with the transmission metal compound to form an ionic complex and an organoaluminium compound.

EP-A-0600482 discloses the production of a resin composition of laminates which includes two polyethylene components, one of the components being prepared using a metallocene catalyst comprising ethylene-bis(4,5,6,7-tetrahydroindenyl) zirconium dichloride.

EP-A-0575123 discloses an ethylene polymer composition which may be produced using a metallocene catalyst.

EP-A-0605952 discloses an ethylene/alpha-olefin comonomer composition and a polymerisation process therefor which employs at least two kinds of specific metallocene compounds.

EP-A-0735090 discloses a polyethylene resin composition which is produced by physical blending of three polyethylene components.

EP-A-0791627 discloses a polyethylene resin composition which is produced using a metallocene catalyst.

WO-A-95/26990 discloses a process for producing polymers of multi-modal molecular weight distributions using metallocene catalysts.

SUMMARY OF THE INVENTION

The present invention aims to overcome the disadvantages of the prior art.

The present invention provides a process for the preparation of polyethylene resins having a multimodal molecular weight distribution which comprises:

(i) contacting ethylene monomer and a comonomer comprising an alpha-olefin having from 3 to 10 carbon atoms with a first catalyst system in a first reactor under first polymerisation conditions to produce a first polyethylene having a first molecular weight, an HLMI of not more than 0.5 g/10 min and a first density of not more than 0.925 g/ml and the first catalyst system comprising (a) a metallocene catalyst comprising a bis tetrahydroindenyl compound of the general formula $(IndH_4)_2R''MQ_2$ in which each Ind is the same or different and is indenyl or substituted indenyl, R'' is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen; and (b) a cocatalyst which activates the catalyst component;

(ii) providing a second polyethylene having a second lower molecular weight and a second higher density than the first polyethylene, the second polyethylene having been produced using a catalyst other than the bis tetrahydroidenyl compound; and (iii) mixing together the first and second polyethylenes to form a polyethylene resin having a multimodal molecular weight distribution.

Optionally, the polyethylene resin is a pipe resin having an HLMI of from 3 to 10 g/10 min and a density of from 0.95 to 0.96 g/ml.

In this specification, the HLMI is measured by the procedures of ASTM D 1238 using a load of 21.6 kg at a temperature of 190° C.

The present invention further provides a process for the preparation of polyethylene resins having a bimodal molecular weight distribution which comprises:

(i) contacting ethylene monomer and a comonomer comprising an alpha-olefin having from 3 to 10 carbon atoms with a first catalyst system in a first reactor under first polymerisation conditions to produce a first polyethylene having a first molecular weight, an HLMI of not more than 0.5 g/10 min and a first density of not more than 0.925 g/ml and the first catalyst system comprising (a) a metallocene catalyst comprising a bis tetrahydroindenyl compound of the general formula $(IndH_4)_2R"MQ_2$ in which each Ind is the same or different and is indenyl or substituted indenyl, R" is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen; and (b) a cocatalyst which activates the catalyst component;

(ii) providing a second polyethylene having a second lower molecular weight and second higher density than the first polyethylene; and (iii) mixing together the first and second polyethylenes to form a polyethylene resin having a bimodal molecular weight distribution, an HLMI of from 3 to 10 g/10 min and a density of from 0.95 to 0.96 g/ml.

The present invention yet further provides a process for the preparation of a linear low density polyethylene resin having a bimodal molecular weight distribution which comprises:

(i) contacting ethylene monomer and a comonomer comprising an alpha-olefin having from 3 to 10 carbon atoms with a catalyst system in a first reactor under first polymerisation conditions to produce a first polyethylene and the catalyst system comprising (a) a metallocene catalyst comprising a bis tetrahydroindenyl compound of the general formula $(IndH_4)_2R"MQ_2$ in which each Ind is the same or different and is indenyl or substituted indenyl, R" is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen; and (b) a cocatalyst which activates the catalyst component;

(ii) transferring the catalyst system and the first polyethylene to a second reactor serially connected to the first reactor and in the second reactor contacting ethylene monomer and a comonomer comprising an alpha-olefin having from 3 to 10 carbon atoms with the catalyst system under second polymerisation conditions to produce a product comprising a second polyethylene having a different molecular weight distribution than that of the first polyethylene; and (iii) blending together the first and second polyethylenes in the second reactor to form a linear low density polyethylene resin having a bimodal molecular weight distribution and a density of around 0.925 g/ml.

The first polyethylene may be monomodal or bimodal, the second polyethylene may have a monomodal molecular weight distribution and may have been produced using a metallocene catalyst, a Ziegler-Natta catalyst or a chromium-oxide based catalyst. Alternatively, the second polyethylene may have a bimodal molecular weight distribution and has been produced using one or two of those different catalyst systems. The first and second polyethylenes may be mixed together with a third polyethylene to provide a trimodal molecular weight distribution in the resultant polyethylene resin. The third polyethylene may be produced using a metallocene catalyst, a Ziegler-Natta catalyst or a chromium-oxide based catalyst.

The first and second polyethylenes may be mixed by chemical blending or physical blending. For chemical blending, the first and second polyethylenes are made in two serially connected reactors using a common metallocene catalyst (a), or three serially connected reactors for making a polyethylene resin having a trimodal molecular weight distribution, in which a third polyethylene is chemically blended with the first and second polyethylenes. In an alternative arrangement, the first and second polyethylenes may be chemically blended as foresaid, and then physically blended with a third polyethylene to produce a trimodal molecular weight distribution. In further alternative arrangements, the polyethylene resin has a bimodal molecular weight distribution and is produced by physically blending the first and second polyethylenes together or alternatively the polyethylene resin has a trimodal molecular weight distribution and is produced by physically blending together the first, second and third polyethylenes. Alternatively, a trimodal polyethylene may be produced in three reactors in series.

In the embodiments of the invention, the low density fraction produced using the metallocene catalyst (a) comprises at least 15 wt % of the resultant polyethylene resin.

The present invention is predicated on the discovery that the use of the particular bisetrahydroindenyl metallocene catalyst component (a) enables a high molecular weight linear low density polyethylene fraction e.g. in a pipe resin to be produced, with that fraction having a very narrow molecular weight distribution. This yields both improved slow and rapid crack propagation properties as a result of a high and uniform level of comonomer distribution in the low density fraction, with a density not more than 0.925 g/ml, compared to somewhat higher low density fractions achievable by Ziegler-Natta or chromium based catalysts, particularly when used in a slurry loop process. Thus the use of this metallocene catalyst enables precise control of the molecular weight distribution and density of the high molecular weight fraction of a pipe resin, yielding improved mechanical properties and processability. The HLMI of the high molecular weight, low density fraction is very low. The values of HLMI are representative of the high molecular weight of the fraction. Typically, overall the multimodal pipe resins of the present invention have a density of from 0.95 to 0.96 g/ml with an HLMI of from 3 to 10 g/10 min. The pipe resin consists not only of the high molecular weight fraction, but also a low molecular weight fraction whereby the pipe resin as a whole has a multimodal, for example a bimodal, molecular weight distribution.

The provision of such a multimodal distribution yields a combination of improved mechanical properties of the pipe resin, without compromising the processability.

In accordance with this invention, the low molecular weight fraction of the polyethylene resin for the production of pipes may be constituted by a second polyethylene which typically has a monomodal or bimodal molecular weight distribution and is produced by ethylene homo and/or copolymerisation in the presence of a metallocene catalyst system and/or a Ziegler-Natta catalyst system and/or a chromium-oxide based catalyst system.

A third polyethylene resin may also be provided which has a monomodal or bimodal molecular weight distribution and is produced using a metallocene catalyst system and/or a Ziegler-Natta catalyst system and/or a chromium-oxide based catalyst system but which has a different density and molecular weight distribution from that of the second polyethylene resin.

The first and second, and optionally third, polyethylenes constitute separately produced resins which may then be physically and/or chemically blended (in this case using a plurality of reactors in series) to form the composite polyethylene resin having a multimodal molecular weight distribution. The production of the polyethylene comprising the lower molecular weight fraction of the composite resin can be controlled to give the desired processing properties for the pipe resin. It has been shown that the combination of low branching (ideally no branching) in the low molecular part of the resin and high comonomer incorporation in the high molecular part significantly improves the resin properties with respect to resistance to slow crack growth and impact strength which are important properties for pipe resins.

In one preferred aspect of the invention, the first and second polyethylenes are physically blended to form a linear low density polyethylene (LLDPE) resin and the first and second polyethylenes are produced using the metallocene catalyst (a). Preferably, each of the first and second polyethylenes has a density of around 0.925 g/ml. Alternatively, in a preferred embodiment the first polyethylene has a density of around 0.905 g/ml and the second polyethylene has a density of around 0.930 g/ml. More preferably, the physical blend comprises substantially equal parts by weight of the first and second polyethylenes and has an HLMI of from 7 to 7.5 g/10 min. In another preferred aspect of the invention, the first and second polyethylenes are chemically blended and are produced using the metallocene catalyst (a). Preferably, the first and second polyethylenes together have a bimodal molecular weight distribution in the LLDPE.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Metallocene Components

Figure 1:
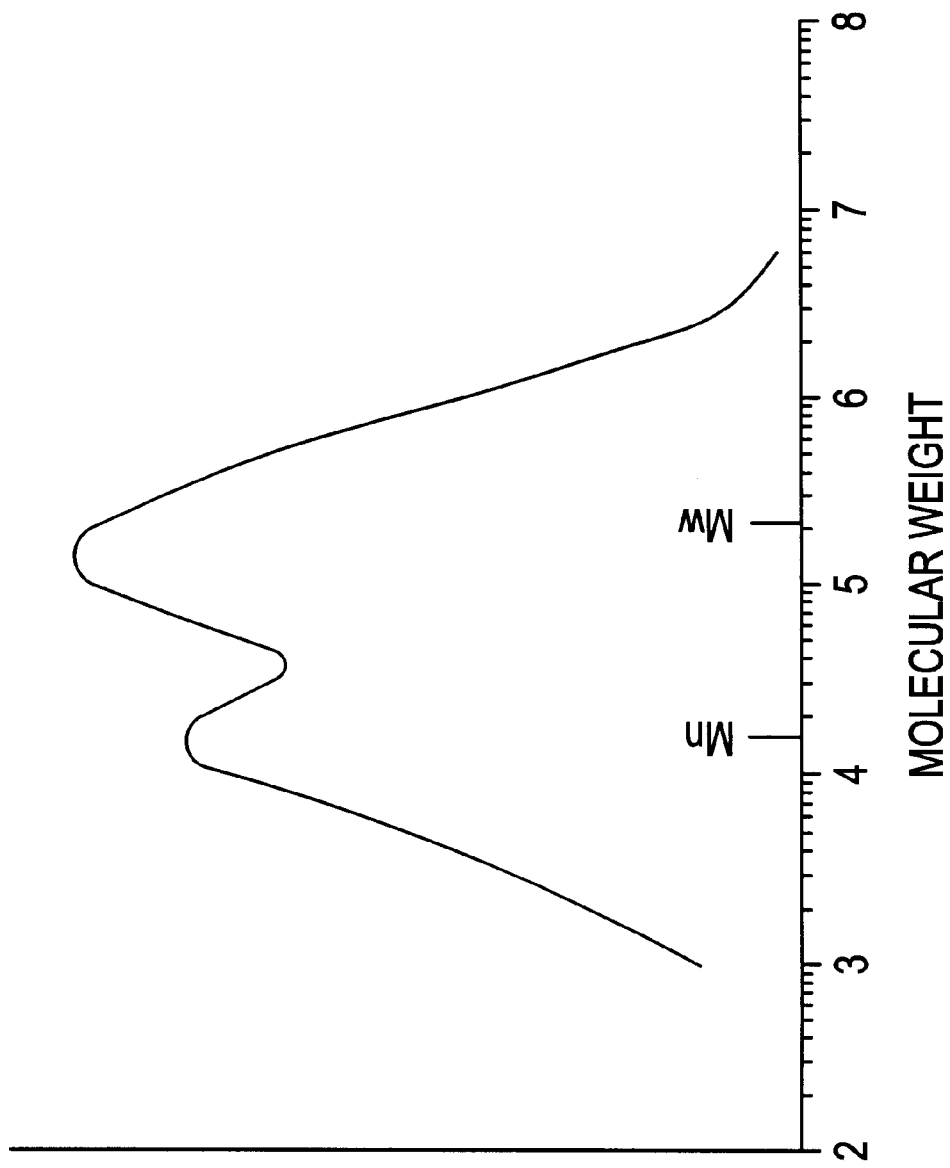
FIGS. 1 and 2 are gel permeation chromatographs of resins produced in accordance with the invention.

In the metallocene catalyst component (a), each bis tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_V$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or CH3. More preferably, at least one and most preferably both cyclopentadienyl rings are unsubstituted.

In a particularly preferred embodiment, both indenyls are unsubstituted.

R" is preferably a methylene or ethylene bridge which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound of the present invention.

The metallocene catalyst component (a) used in the present invention can be prepared by any known method. A preferred preparation method is described in J. Org. Chem. 288, 63–67 (1985).

The cocatalyst which activates the metallocene catalyst component can be any cocatalyst known for this purpose such as an aluminium-containing cocatalyst or a boron-containing cocatalyst. The aluminium-containing cocatalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

(I)

for oligomeric, linear alumoxanes and

(II)

for oligomeric, cyclic alumoxane, wherein n is 1–40, preferably 10–20, m is 3–40, preferably 3–20 and R is a $C_1$–$C_8$ alkyl group and preferably methyl.

Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'—H]+[B Ar$_1$ Ar$_2$ X$_3$ X$_4$]—as described in EP-A-0277004 (page 6, line 30 to page 7, line 7).

The metallocene catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene. Preferably, the support is a silica having a surface area comprised between 200 and 900 m2/g and a pore volume comprised between 0.5 and 4 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

Where the reaction is performed in a slurry using, for example, isobutane, a reaction temperature in the range 70° C. to 110° C. may be used. Where the reaction is performed in solution, by selection of a suitable solvent a reaction temperature in the range 150° C. to 300° C. may be used. The reaction may also be performed in the gas phase using a suitably supported catalyst.

In accordance with the invention, ethylene and the alpha-olefinic comonomer are supplied to the reactor containing the metallocene catalyst. Typical comonomers include hexene, butene, octene or methylpentene, preferably hexene. Hydrogen may be additionally supplied to the first reaction zone. Because the metallocene catalyst component of the present invention exhibits good comonomer response as well as good hydrogen response, substantially all of the comonomer is consumed in the first reactor in this embodiment. This produces high molecular weight polyethylene copolymer having a monomodal molecular weight distribution.

The temperature of the reactor may be in the range of from 70° C. to 110° C., preferably from 70° C. to 100° C.

The HLMI of the high molecular weight polyethylene fraction, comprising a linear low-density polyethylene, made in accordance with the present invention typically falls in the range 0.02 to 0.3 g/10', preferably in the range 0.03 to 0.15 g/10'. The density of the high molecular weight resin fraction is typically in the range 0.9 to 0.925 g/ml, preferably 0.905 to 0.915 g/ml. The high molecular weight polyethylene fraction preferably has a molecular weight distribution in the range 2 to 4.5, preferably around 3 and more preferably is partially long chain branched so as to facilitate processing.

Chromium-Based Catalysts

The chromium-based catalyst preferably comprises a silica, silica-alumina and/or titania supported chromium oxide catalyst. A particularly preferred chromium-based catalyst may comprise from 0.5 to 5 wt % chromium, preferably around 1 wt %, on a catalyst support. The weight percentage of chromium is based on the weight of the chromium-containing catalyst. The chromium-based catalyst may have a specific surface area of from 200 to 700 $m^2/g$, preferably from 400 to 550 $m^2/g$ and a volume porosity of from 0.9 to 3 cc/g, preferably from 2 to 3 cc/g. The average pore radius is preferably from 100 to 1000A, most preferably from 150 to 250 A.

A preferred chromium-based catalyst for use in the present invention comprises a catalyst which has an average pore radius of 190 A, a pore volume of around 2.1 cc/g and a chromium content of around 1 wt % based on the weight of the chromium-containing catalyst. The support comprises a silica and titania support.

The chromium-based catalyst may have been subjected to a reduction and reoxidation process in which at least a portion of the chromium is reduced to a low valance state and then at least a portion of the chromium is reoxidised to a higher valance state. Such a reduction and reoxidation process is known in the art. Preferably, the chromium-based catalyst is reduced in an atmosphere of dry carbon monoxide in known manner at a temperature of from 700 to 900° C., preferably at a temperature of around 860° C. The chromium-based catalyst is then reoxidised in air in known manner at a temperature of from 700 to 900° C., preferably at a temperature of around 760° C. Alternatively, the chromium-based catalyst may have been activated at a relatively low temperature, fluoridised before or after the activation step to increase the activity of the catalyst and then reduced. In this alternative, the chromium-based catalyst may either be a fluorine-containing catalyst which is commercially available, or may be a similar yet non-fluorine-containing catalyst, which is then subjected to a fluoridisation or fluorination step which is performed in known manner. For example, the chromium-based catalyst may be premixed with a fluorine-containing compound such as ammonium boron tetrafluoride ($NH_4BF_4$) in solid form and then heated at elevated temperature so as to react together the catalyst and the fluorine-containing compound. Such a fluorinisation step may be performed before or during the activation step.

The catalyst is activated in air at a relatively low activation temperature ranging from 450 to 750° C. More preferably, the activation is carried out at a temperature of from 500 to 650° C. A most preferred activation temperature is around 540° C.

Following the activation step, the second chromium-based catalyst may be subjected to a chemical reduction step employing dry carbon monoxide. The reduction step is preferably carried out at a temperature of from 300 to 500° C. A most preferred reduction temperature is around 370° C.

In the preferred process of the present invention to form the low molecular weight fraction of relatively high density using a chromium-based catalyst, the polymerisation or copolymerisation process is carried out in the liquid phase comprising ethylene, and where required an alpha-olefinic comonomer comprising from 3 to 10 carbon atoms, in an inert diluent. The comonomer may be selected from 1-butene, 1-pentene, 1-hexene, 4-methyl 1-pentene, 1-heptene and 1-octene. The inert diluent is preferably isobutane. The polymerisation or copolymerisation process is typically carried out at a temperature of from 85 to 110° C., more preferably from 90 to 100° C., and at a pressure of from 20 to 42 bar, more preferably at a minimum pressure of 24 bar.

Typically, in the polymerisation process the ethylene monomer comprises from 0.5 to 8% by weight, typically around 6% by weight, of the total weight of the ethylene in the inert diluent. Typically, in the copolymerisation process the ethylene monomer comprises from 0.5 to 8% by weight and the comonomer comprises from 0 to 4% by weight, each based on the total weight of the ethylene monomer and comonomer in the inert diluent.

The chromium-based catalyst is introduced into the polymerisation reactor. The alkylene monomer, and comonomer if present, are fed into the polymerisation reactor and the polymerisation product of HDPE is discharged from the reactor and separated from the diluent which can then be recycled.

Ziegler-Natta Catalysts

In the preferred process of the present invention, the homopolymerisation process with optional copolymerisation, using a Ziegler-Natta catalyst to produce a polyethylene having a monomodal molecular weight distribution, is carried out in the liquid phase in an inert diluent, the reactants comprising ethylene and hydrogen for homopolymerisation and for copolymerisation ethylene and an alpha-olefinic comonomer comprising from 3 to 8 carbon atoms. The comonomer may be selected from 1-butene, 1-pentene, 1-hexene, 4-methyl 1-pentene, 1-heptene and 1-octene. The inert diluent may comprise isobutane.

The polymerisation process is preferably carried out at a temperature of from 50 to 120° C., more preferably from 60 to 110° C., under an absolute pressure of 1 to 100 bar.

In the reactor, the ethylene monomer preferably comprises from 0.1 to 3% by weight based on the total weight of the ethylene monomer in the inert diluent and the hydrogen comprises from 0.1 to 2 mol % on the same basis. A particularly preferred composition in the reactor comprises 1% by weight ethylene and 0.8 mol % hydrogen. If a minor degree of copolymerisation is also carried out in the reactor, an alpha-olefinic comonomer as described above, typically hexene, is also introduced into the reactor. The proportion of comonomer introduced is limited to an amount whereby the density of the polyethylene produced in the reactor is at least 0.96 g/ml. The polymerisation product from the reactor preferably has a melt index MI2 of from 5 to 200 g/lomin, more preferably from 25 to 100 g/10 min, the melt index MI2 being measured determined using the procedures of ASTM D1238 using a load of 2.16 kg at a temperature of 190° C. The melt index MI2 is broadly inversely indicative of the molecular weight of the polymer. In other words, a low melt index is indicative of a high molecular weight for the polymer and vice versa. Typically, the polyethylene produced in the reactor has a density of over 0.96 g/ml, more typically around 0.97 g/ml.

The Ziegler-Natta catalyst preferably consists of a transition metal component (compound A) which is the reaction product of an organomagnesium compound with a titanium compound and an organoaluminium component (compound B).

As transition metal compounds suitable for the preparation of compound A, there are used tetravalent halogenated titanium compounds, preferably titanium compounds of the general formula $TiX_n(OR)_{4-n}$ in which n is 1 to 4, X stands for chlorine or bromine, and R for identical or different hydrocarbon radicals, especially straight-chain or branched alkyl groups having 1 to 18, preferably 1 to 10, carbon atoms.

Examples thereof are:

$TiCl_4$, $Ti(OC_2H_5)_2Cl_2$, $Ti(OC_2H_5)_3Cl$, $Ti(OC_3H_7)_2$, $Ti(OC_3H_7)_3Cl$, $Ti(OiC_3H_7)_2Cl_2$, $Ti(OiC_3H_7)_3Cl$, $Ti(OiC_4H_9)_2C_2$, $Ti(OiC_4H_9)_3Cl$

In some cases, it may be advantageous to prepare the halogeno-ortho-titanic acid esters of the above formula in situ by reacting the respective ortho-titanic acid ester with $TiCl_4$ in a corresponding proportion.

This reaction is advantageously carried out at temperatures of from 0 to 200° C., the upper temperature limit being determined by the decomposition temperature of the tetravalent halogenated titanium compound used; it is advantageously carried out at temperatures of from 60 to 120° C.

The reaction may be effected in inert diluents, for example aliphatic or cycloaliphatic hydrocarbons as are currently used for the low pressure process such as butane, pentane, hexane, heptane, cyclohexane, methyl-cyclohexane as well as aromatic hydrocarbons, such as benzene or toluene; hydrogenated Diesel oil fractions which have been carefully freed from oxygen, sulphur compounds and moisture are also useful.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

For preparing compound A, magnesium alcoholates, preferably those of the general formula $Mg(OR)_2$ are used, in which R stands for identical or different hydrocarbon radicals, preferably straight-chain or branched alkyl groups having 1 to 10 carbon atoms; magnesium alcoholates having alkyl groups from 1 to 4 carbon atoms are preferred. Examples thereof are $Mg(OCH_3)_2$, $Mg(OC_2H_5)_2$, $Mg(OC_3H_7)_2$, $Mg(Oic_3H_7)_2$, $Mg(OC_4H_9)_2$, $Mg(OiC_4H_9)_2$, $Mg(OCH_2-CH_2-C_6H_5)_2$.

The magnesium alcoholates can be prepared by known methods, for example by reacting magnesium with alcohols, especially monohydric aliphatic alcohols.

Magnesium alcoholates of the general formula X—Mg—OR in which X stands for halogen, $(SO_4)_{1/2}$ carboxylate, especially acetate of OH, and R has the above composition, may also be used.

These compounds are, for example, obtained by reacting alcoholic solutions of the corresponding anhydrous acids with magnesium.

The titanium contents of compound A may be within the range of from 0.05 to 10 mg.-atom, per gram of compound A. It can be controlled by the reaction time, the reaction temperature and the concentration of the tetravalent halogenated titanium compound used.

The concentration of the titanium component fixed on the magnesium compound is advantageously in the range of from 0.005 to 1.5 mmol, preferably from 0.03 to 0.8 mmol, per liter of dispersing agent or reactor volume. Generally, even higher concentrations are possible.

The organo-aluminium compounds used may be reaction products of aluminium-trialkyl or aluminium -dialkyl hydrides with hydrocarbon radicals having 1 to 16 carbon atoms, preferably $Al(iBu)_3$ or $Al(iBu)_2H$ and diolefins containing 4 to 20 carbon atoms, preferably isoprene; for example aluminium isoprenyl.

Furthermore, suitable as compound B are chlorinated organo-aluminium compounds, for example dialkyl-aluminium monochlorides of the formula $R_2AlCl$ or alkyl-aluminium sesquichlorides of the formula $R_3Al_2Cl_3$, in which formulae R stands for identical or different hydrocarbon radicals, preferably alkyl groups having 1 to 16 carbon atoms, preferably 2 to 12 carbon atoms, for example $(C_2H_5)_2AlCl$, $(iC_4H_9)_2AlCl$, or $(C_2H_5)_3Al_2Cl_3$.

It is advantageous to use, as compound B, aluminium-trialkyls of the formula $AlR_3$ or aluminium-dialkyl hydrides of the formula $AlR_2H$, in which formulae R stands for identical or different hydrocarbons, preferably alkyl groups having 1 to 16, preferably 2 to 6, carbon atoms, for example $Al(C_2H_5)_3$, $Al(C_2H_5)_2H$, $Al(C_3H_7)_3$, $Al(C_3H_7)_2H$, $Al(iC_4H_9)_3$, or $Al(iC_4H_9)_2H$.

The organoaluminium may be used in a concentration of from 0.5 to 10 mmol per liter of reactor volume.

Optionally, a cocatalyst such as a triethylaluminium (TEAL) is employed in the reactor, for example in an amount of around 250 ppm by weight based on the weight of the inert diluent.

Metallocene Catalysts

The second or third polyethylene may be produced using a metallocene catalyst other than the bistetrahydroindenyl component which is then physically blended with the first polyethylene. The metallocene catalyst preferably has the following general formula:

$Cp_2MX_n$ where Cp is a substituted or unsubstituted cyclopenta diphenyl group; M is a transition metal from Group IVB of the Periodic Table or vanadium; X is a halogen or a hydrocarbyl group having from 1–10 carbon atoms; and n is the valancy of the metal M minus 2. A typical metallocene catalyst is (n-butyl $Cp)_2ZrCl_2$ on a silica support with methyl aluminium oxane as a cocatalyst.

According to the present invention, each polyethylene is produced individually in a reactor, preferably a loop reactor, and then chemically blended together by using a plurality of reactors in series and/or physically blended together for example by extrusion or melt blending. In this way, the low molecular weight and high molecular weight parts of the polyethylene pipe resin can be produced in separate reactors.

The invention will now be described in further detail, by way of example only, with reference to the following non-limiting Examples.

EXAMPLE 1

This Example used the metallocene ethylene bis (4,5,6,7-tetrahydro-1-indenyl) zirconium dichloride in two reactors in series to produce a bimodal polyethylene pipe resin.

The metallocene catalyst which comprised ethylene bis (4,5,6,7-tetrahydro-1-indenyl) zirconium dichloride was prepared in accordance with the method of Brintzinger as published in the Journal of Organometallic Chemistry 288 (1995) pages 63 to 67.

The catalyst was employed in a copolymerisation process to produce a polyethylene copolymer. In a first reactor of two serially connected reactors, the ethylene comprised 5 wt % and the hexene comprised 0.01 wt %, each in the off gas, giving a $C_6/C_2$ ratio of 0.003. The polymerisation temperature was 90° C. Hydrogen was added to the reactor in an amount of 20Nl/h. The resultant polyethylene copolymer which was obtained was measured to have a density of greater than 0.970 g/ml and an HLMI of greater than 20,000 g/10 min.

This first polyethylene product, was used to constitute a low molecular weight, high density fraction of a polyethylene pipe resin which comprised a chemical blend of two separate polyethylenes. The second polyethylene produced in the second of the serially connected reactors using the same catalyst as for the first reactor comprised a low density high molecular weight polyethylene copolymer fraction having a density of 0.923 g/ml and an HLMI of 0.42 g/10 min.

In the polymerisation process to produce the second polyethylene, the polymerisation temperature was 70° C. and in the off gas, there was 5.5 wt % C2 and 1.6 wt % $C_6$ giving a $C_6/C_2$ ratio of 0.29.

The two fractions so formed were chemically blended in the second reactor to form a polyethylene resin in the following proportions by weight: 50 wt % of the low density fraction; 50 wt % of the high density fraction. The resultant polyethylene resin chemical blend (in its extruded form) had a density of 0.956 g/ml, an $MI_5$ of 0.27 g/10 min and an $SR_5$ of 25.6 (this being the ratio $HLMI/MI_5$). The bimodal molecular weight distribution is shown in FIG. 1. The mechanical properties of the resin were tested. The resin survived a notch pipe test (with a notch of 0.63 mm at a pressure of 4.6 mPa at 80° C.) for a period of greater than 6000 hours. This indicates good resistance to slow crack growth.

In comparison, a known polyethylene pipe resin of grade PE 100 made using a Ziegler-Natta catalyst and having a bimodal molecular weight distribution had an $MI_5$ of 0.27 g/10 min, an $SR_5$ of 30 and a density of 0.960 g/ml. When subjected to the same notch test, this pipe resin only survived for greater than 1000 hours.

EXAMPLE 2

This Example used the metallocene ethylene bis (4,5,6,7-tetrahydro-1-indenyl) zirconium dichloride of Example 1 in two reactors in series to produce a bimodal LLDPE polyethylene resin.

The catalyst comprised 4 wt % on the support.

The catalyst was employed in a copolymerisation process to produce a polyethylene copolymer. In a first reactor of two serially connected reactors, the ethylene comprised 4 wt % and the hexene comprised 3.6 wt %, each in the off gas. The polymerisation temperature was 70° C. and the residence time was 70 minutes. Hydrogen was added to the reactor in an amount of 0.2 Nl/h.

This first polyethylene product was used to constitute a first LLDPE fraction of an LLDPE bimodal resin which comprised a chemical blend of two separate polyethylenes. The second polyethylene produced in the second of the serially connected reactors using the same catalyst as for the first reactor comprised an LLDPE polyethylene.

In the polymerisation process to produce the second polyethylene, the polymerisation temperature was 90° C. for a residence time of 180 minutes, and in the off gas, there was 6 wt % ethylene and 0 wt % hexene. Hydrogen was added to the reactor in an amount of 3.0 Nl/h.

Figure 2:
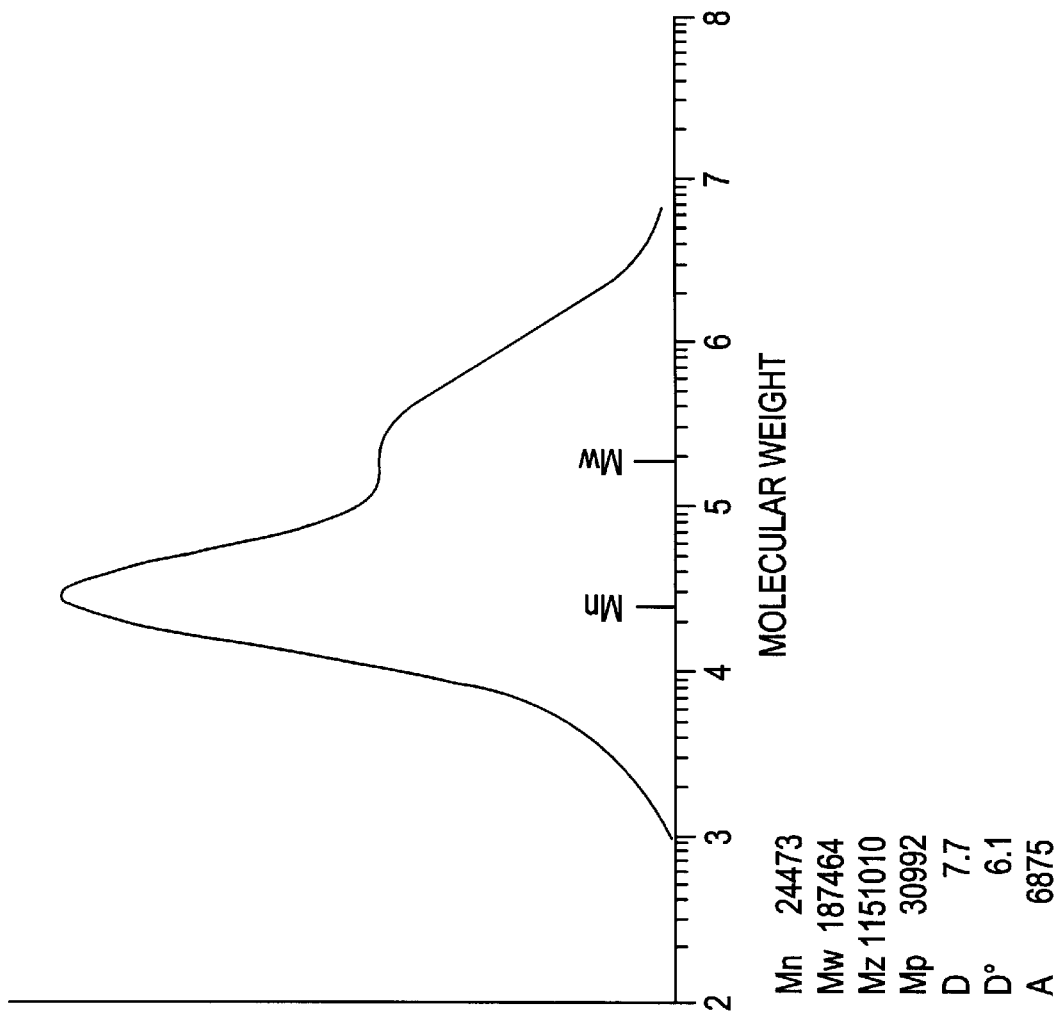

The two fractions so formed were chemically blended in the second reactor to form a polyethylene resin in the following proportions by weight: 50 wt % of the first fraction; 50 wt % of the second fraction. The resultant polyethylene resin chemical blend (in its extruded form) had a density of 0.925 g/ml, an $MI_2$ of 0.2 g/10 min, an HLMI of 17.6 g/10 min and an $SR_2$ of 88 (this being the ratio $HLMI/MI_2$). The bimodal molecular weight distribution is shown in FIG. 2. The resin had an Mn of 24.4 kDa, an Mw of 187 kDa and a dispersion index D of 7.7.

Comparative Example 1

A bimodal resin was produced using two reactors in series with a Ziegler-Natta catalyst. The first polyethylene fraction comprised a low density polyethylene copolymer having a density of 0.9252 g/ml and an HLMI of 0.263 g/1omin. The Ziegler-Natta catalyst comprised 6.9 wt % Ti, 13.2 wt % Mg and 49.8 wt % Cl. The low density polyethylene fraction was produced using this catalyst at a polymerisation temperature of 80° C. with 1 wt % ethylene and 4.5 wt % hexene in the first reactor, based on the weight of the diluent. Hydrogen gas was added in an amount of 0.01 vol%.

The second polyethylene fraction comprised a high density polyethylene homopolymer with a density of 0.9685 g/ml and an $MI_2$ of 65 g/10 min. The high density fraction was produced using the same Ziegler-Natta catalyst as for the low density fraction in the second reactor. In the polymerisation process, the polymerisation temperature was 95° C. with 1.95 wt % ethylene and no hexene. Hydrogen was added in an amount of 0.9 vol %. The two fractions were chemically blended in the second reactor to form a polyethylene resin in the following proportions by weight: 48 wt % of the low density fraction; and 52 wt % of the high density fraction. The resultant polyethylene resin which typifies a known PE100 bimodal pipe resin had a density of 0.949 g/ml and an HLMI of 10.3 g/10 min. The resin had an Mn of 15.5 kDa; Mw of 266 kDa and MWD of 17.1. The mechanical properties of the resin were tested. The resin had an energy at break of only 43 $kJ/m^2$.

Comparative Example 2

In this Comparative Example two resins produced separately using the Ziegler-Natta catalyst of Comparative Example 1 were physically blended to produce a pipe resin. The first resin had a density of 0.9208 g/ml, an HLMI of 0.53 g/10 min, an Mn of 58.7 kDa, an Mw of 476 kDa and an MWD of 8.1.

This first polyethylene resin, was used to constitute a high molecular weight, low density fraction of a polyethylene pipe resin which comprised a physical blend of the two separate polyethylenes. The second polyethylene resin comprised a high density polyethylene having a density of 0.9676 g/ml, an $MI_2$ of 42 g/10 min, an Mn of 10.7 kDa, an Mw of 48 kDa and an MWD of 4.5.

The two fractions were physically blended to form a polyethylene resin in the following proportions by weight: 40 wt % of the low density fraction and 60 wt % of the high density fraction. The resultant polyethylene resin blend (in its extruded form) had a density of 0.9502 g/ml, an HLMI of 24.3 g/10 min, an Mn of 16.6 kDa, an Mw of 226 kDa and an MWD of 13.6. The mechanical properties of the resin were tested. The resin had an energy at break of only 19.8 $kJ/m^2$.

What is claimed is:

1. A process for the preparation of a linear low density polyethylene resin having a bimodal molecular weight distribution which comprises:

(i) contacting ethylene monomer and a comonomer comprising an alpha-olefin having from 3 to 10 carbon atoms with a catalyst system in a first reactor under first polymerisation conditions to produce a first polyethylene and the catalyst system comprising (a) a metallocene catalyst comprising a bis tetrahydroindenyl compound of the general formula $(IndH_4)_2R"MQ_2$ in which each Ind is the same or different and is indenyl or substituted indenyl, R" is a bridge which comprises a $C_1$–$C_{20}$ alkylene radical, a dialkyl germanium or silicon or siloxane, or an alkyl phosphine or amine radical, which bridge is substituted or unsubstituted, M is a Group IVB transition metal or vanadium and each Q is hydrocarbyl having 1 to 20 carbon atoms or halogen; and (b) a cocatalyst which activates the catalyst component;

(ii) transferring the catalyst system and the first polyethylene to a second reactor serially connected to the first reactor and in the second reactor contacting ethylene monomer and a comonomer comprising an alpha-olefin having from 3 to 10 carbon atoms with the catalyst system under second polymerisation conditions to produce a product comprising a second polyethylene having a different molecular weight distribution than that of the first polyethylene; and (iii) blending together the first and second polyethylenes in the second reactor to form a linear low density polyethylene resin having a bimodal molecular weight distribution and a density of around 0.925 g/ml.

2. A process according to claim 1 wherein the first and second polyethylenes have a density of around 0.925 g/ml.

3. A process according to claim 1 wherein the polyethylene resin is a pipe resin and the first polyethylene has a density of around 0.9 g/ml and comprises at least 15% by weight of the polyethylene resin.

4. A process according to claim 1 wherein R" is Ph—C—Ph.

5. A process according to claim 1 wherein the first and second polyethylenes are linear low density polyethylenes and the second polyethylene has a density of not more than 0.930 g/ml.

6. A process according to claim 5 wherein the polyethylene resin is physically blended, comprises substantially equal parts by weight of the first and second polyethylenes and has an HLMI of from 7 to 7.5 g/10 min.

* * * * *